March 15, 1932. C. A. WRIGHT 1,849,898
TRIPOD
Filed Aug. 1, 1930 2 Sheets-Sheet 1

Inventor:
Charles A. Wright
by his Attorneys
Howson & Howson

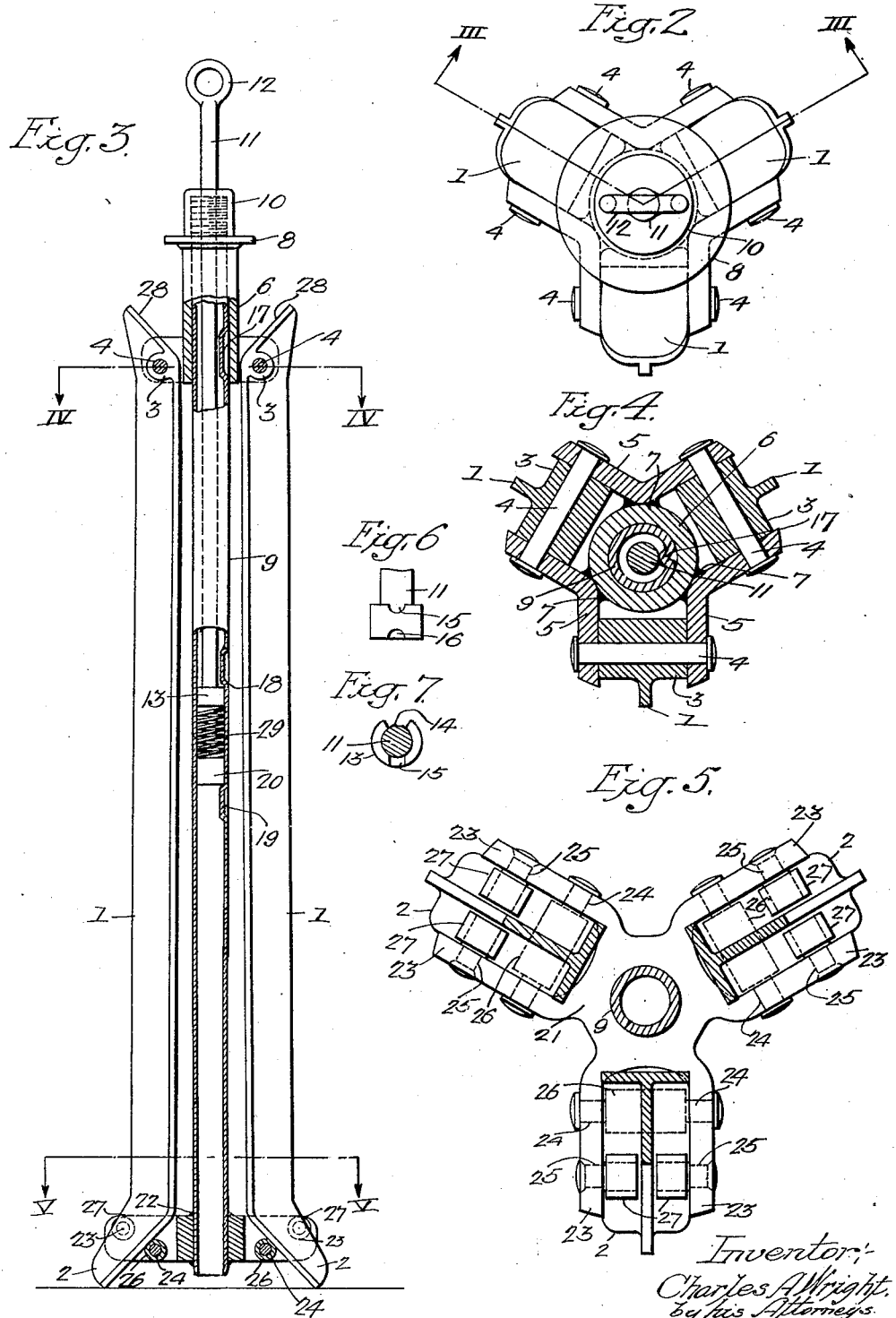

Patented Mar. 15, 1932

1,849,898

UNITED STATES PATENT OFFICE

CHARLES A. WRIGHT, OF RIVERTON, NEW JERSEY, ASSIGNOR TO ANTEEK FORJ INCORPORATION, OF RIVERTON, NEW JERSEY, A CORPORATION OF NEW JERSEY

TRIPOD

Application filed August 1, 1930. Serial No. 472,396.

The present invention relates to that general class of devices known as tripods, and has for its general object the provision of a device of simple construction and which is at the same time capable of efficient operation.

The invention has for a further object the provision of a device whose parts may be easily and quickly adjusted to their operative and inoperative positions.

A still further object of the invention is to provide a device which will not get out of adjustment when once its parts have been adjusted to their respective operative positions.

Another object of the invention is to provide a device which is particularly adapted to support a danger flag, or other danger-signaling device, when repair men are working in the locality. An example of such use would be to support a danger-signaling device while repair men are working in a manhole with the manhole cover removed. While the device is especially suitable for such use, it will be readily apparent that it may be used in any instance where a tripod is useful or necessary. The device is especially useful in instances mentioned because it may be very readily put up or taken down, and when it is in its inoperative or folded condition, it presents a small article of light weight which may be readily carried about.

The above objects, as well as the details of construction of my device will be more apparent from the following detailed description in connection with the accompanying drawings.

In the drawings:

Fig. 2 is a plan view of the device of Fig. 1 when the parts thereof are in their inoperative positions;

Fig. 3 is a sectional view along lines III—III of Fig. 2;

Fig. 4 is a sectional view along line IV—IV of Fig. 3;

Fig. 5 is a sectional view along line V—V of Fig. 3;

Fig. 6 shows the lower portion of the slidable rod of my device with the associated notched collar for limiting the movement of the rod; and Fig. 7 is a plan view of the parts shown in Fig. 6.

Figure 1:
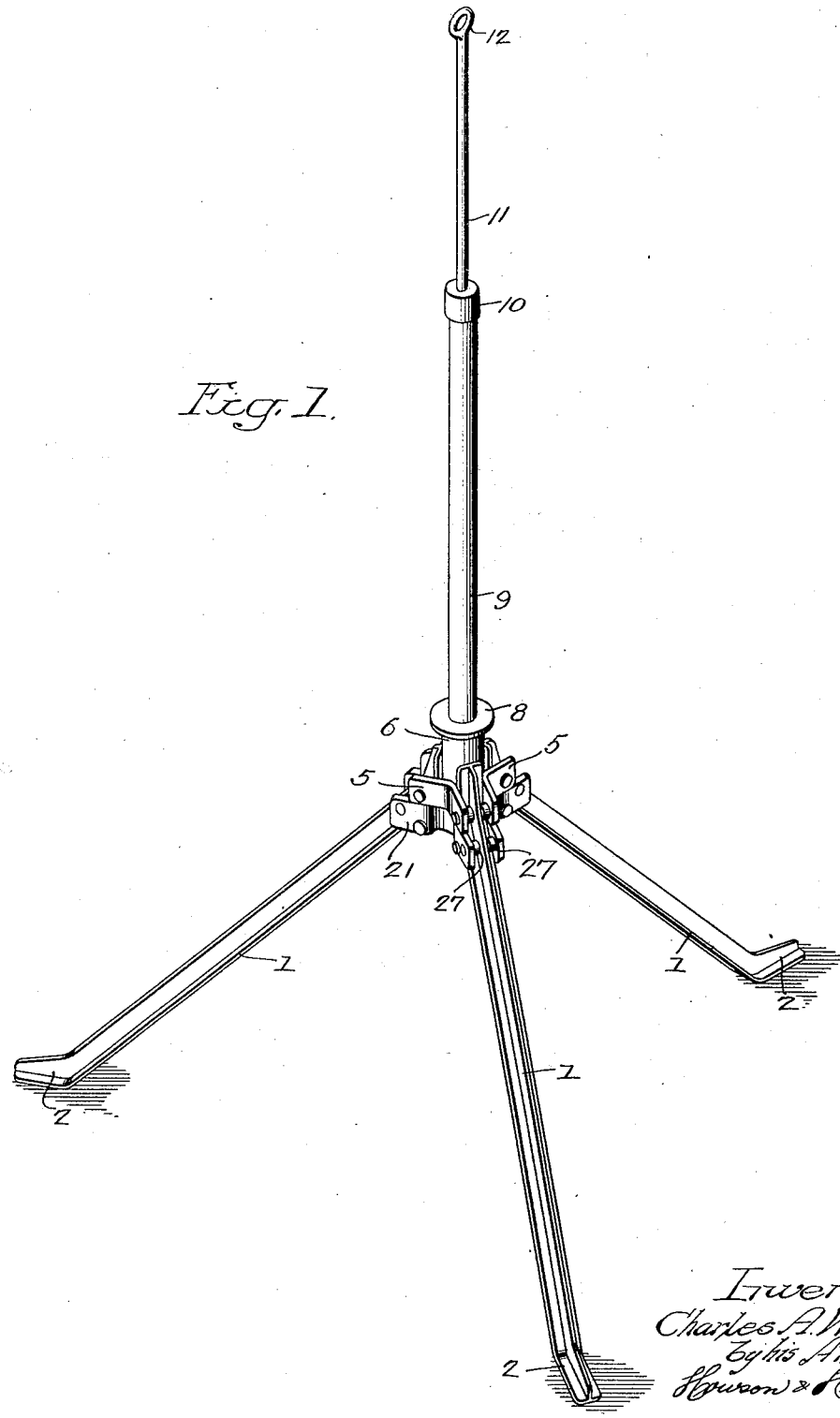
Fig. 1 is a perspective view of my tripod with its parts in operative position.

Referring to the several views of the drawings, I provide a plurality of legs or supporting members 1, three being used in the present instance. These legs are T-shaped in cross section and have at their lower extremities extending feet portions 2. At their upper extremities, the legs are provided with pivotal portions 3 which have holes extending therethrough to receive pivot members or pins 4. Three angle members 5 are also provided with holes for the reception of pins 4, and are disposed with respect to the upper portions of legs 3 in the manner shown clearly in Fig. 4. Each of these angle members is preferably welded as at 7 to a sleeve 6. Of course, they may be attached to the sleeve in any other suitable manner. The sleeve 6 is provided at its upper extremity with an extending flange portion 8. This flange may take the form of a separate element which is welded to the sleeve, or it may be formed integral with the sleeve. From the description thus far, it will be apparent that the supporting legs are adapted to swing outward on their pivoting supports as shown in Fig. 1.

A second sleeve 9 is slidably mounted within sleeve 6 and has its upper portion threaded to receive a cap member 10. The cap member is provided with a hole through which rod 11 extends. This rod is mounted within the sleeve 9 for both longitudinal and rotary movement with respect thereto. Cap 10 limits the downward movement of sleeve 9 within the sleeve 6 by resting on flange 8. Rod 11 is provided at its upper end with any suitable supporting means, such as ring 12. In the present instance, ring 12 is provided to support a danger-signaling device, such as a flag. It will be obvious, however, that any suitable supporting means may be provided at the upper end of rod 11. At its lower extremity, rod 11 is provided with a notched collar 13, shown more clearly in Figs. 6 and 7. This notched collar may be formed integral with rod 11 or may take the form of a separate element fastened to the rod in any desired manner. The collar is notched along one side 14 and is provided on the opposite side with notches 15 and 16. A pair of spaced ridges 17 and 18 are provided on the inside of sleeve 9 by denting the same with a blunt-edged instrument or in any other desired manner.

It will be apparent that as rod 11 moves longitudinally in guide 9, the collar 13 will engage either ridge 17 or ridge 18 to limit the movement of the rod unless the notched portion 14 of the collar is directly adjacent the ridge in question. By turning rod 11, therefore, longitudinal movement thereof may be prevented. When it is desired to extend rod 11, the said rod is turned to the position where the notched portion of the collar member allows movement of the rod past ridges 18 and 17, respectively. After the collar passes ridge 17, the rod may be rotated so that ridge 17 engages notch 16 of the collar to prevent downward movement of the rod. Likewise, when it is desired to lower rod 11, the rod is turned and lowered until collar 13 passes below ridge 18 and is then turned so that ridge 18 engages notch 15 of the collar. This prevents rod 11 from moving of its own accord with respect to sleeve 9. A third ridge 19 is provided in sleeve 9 and supports a short sleeve 20. A coil spring 29 is supported upon sleeve 20 in sleeve 9 between sleeve 20 and ridge 18. The spring urges rod 11 upward and the rod must be pushed downward to overcome the action of spring when it is being locked in the manner before described.

Sleeve 9 is provided at its lower end with a spider member 21, shown more clearly in Fig. 5, which may be welded to the sleeve as shown at 22. This spider has three pairs of extending arms 23, each of which is provided with holes for the reception of roller supporting pins 24 and 25. Pins 24 support rollers 26, while pins 25 support rollers 27. Rollers 26 are adapted to move along the under surface of the respective supporting legs, while rollers 27 are adapted to move along the adjacent upper surfaces of the legs. As will appear hereinafter, the spider and roller assembly constitutes a spreader member for spreading the legs.

If it is desired to adjust the parts of the device to their operative positions, assuming that the device is in its inoperative condition as shown in Fig. 3, it is only necessary to grasp sleeve 6 to hold it stationary and, at the same time, grasp cap 10 to extend sleeve 9. This will cause the supporting legs of the device to extend outward due to the forces exerted on them by the spider-supported rollers. The outward movement of the supporting legs is limited by portion 28 of the legs which comes in contact with the sides of sleeve 6. Obviously, portion 28 of the legs may be given any desired angle to limit the outward movement of the legs to any desired position. Sleeve 9 and the spider supported thereby cannot, of course, slide downward in sleeve 6 after the legs have been properly extended, because the legs frictionally engage the surface on which they are supported and, therefore, serve to keep sleeve 9 in its extended position. It is now only necessary to press down on rod 11 and at the same time turn it until the notched portion of the collar allows the rod to extend past ridges 18 and 17. After the collar passes ridge 17, the rod is again turned until the ridge engages slot 16 of the collar.

In returning the parts of the device to the position shown in Fig. 3, rod 11 is lifted and turned until the notched portion of the collar allows the rod to descend past ridges 17 and 18. After the collar passes ridge 18, the rod is again turned until ridge 18 engages slot 15 of the collar. In locking the rod in this position, the action of spring 29 must be overcome by maintaining sufficient pressure on the rod. Sleeve 9 is now lowered by grasping sleeve 6 as before and at the same time pushing sleeve 9 downward. During this operation, of course, the legs would be lifted slightly above the ground. As sleeve 9 descends, the rollers carried thereby draw the supporting legs inward until the parts reach the positions shown in Fig. 3. The device is now in its inoperative position and may be readily carried about until it is desired to again adjust it to its operatve condition.

It will be apparent that I have provided a device which is easily adjusted and cannot get out of adjustment. The adjustment of my device requires only two simple operations, viz., the extension of sleeve 9 and the extension of rod 11. It is not necessary to tighten or loosen any adjusting nuts or screws. Therefore, the device has an added feature in that there are no adjusting nuts or screws which might get lost due to the constant tightening and loosening of the same whenever the device is adjusted for operation.

Obviously, while I have disclosed a specific form of my invention, the device is susceptible of many changes and modifications which are within the spirit and scope of my invention. Various changes in construction may be made within the contemplated scope of the invention, as will be apparent to those skilled in the art. Therefore, it is to be understood that the device disclosed is for the purpose of illustration only and that my invention is not to be limited thereby but only by the scope of the appended claims.

I claim:

1. In a device of the class described, a hollow member, a plurality of supporting members, each having a longitudinally extending flange, pivoted at one end to said hollow member and adapted to swing outward therefrom, a member slidably mounted in said hollow member, and a plurality of anti-friction devices carried by said slidable member at the lower end thereof, said devices engaging said flange to cause said supporting members to swing outward or inward when said slidable member is moved in said hollow member.

2. In a device of the class described, a hollow member, a plurality of supporting members pivoted at one end to said hollow member and adapted to swing outward therefrom, the free ends of said supporting members having angularly extending foot portions, a member slidably mounted in said hollow member, and a rigid spreader member carried at the lower end of said slidable member, said spreader member comprising means engaging said supporting members and their angularly extending foot portions for causing said supporting members to swing outward or inward when said slidable member is moved in said hollow member, said angularly extending foot portions serving as cam surfaces to fully retract and impart initial movement to said supporting members during operation of the device.

3. In a device of the class described, a hollow member, a plurality of supporting members, each having a longitudinally extending flange, pivoted at one end to said hollow member and adapted to swing outward therefrom, a member slidably mounted in said hollow member, a spider carried by said slidable member at the lower end thereof, and a plurality of anti-friction devices carried by said spider, said devices engaging said flanges to cause said supporting members to swing outward or inward when said slidable member is moved in said hollow member.

4. In a device of the class described, a hollow member, a plurality of supporting members, each being T-shaped in cross-section, pivoted at one end to said hollow member and adapted to swing outward therefrom, a member slidably mounted in said hollow member, a spider carried by said slidable member at the lower end thereof, and a plurality of rollers carried by said spider, said rollers engaging the longitudinal flanges of said supporting members to cause them to swing outward or inward when said slidable member is moved in said hollow member.

5. In a device of the class described, a hollow member, a plurality of supporting members, each having a longitudinally extending flange, pivoted at one end to said hollow member and adapted to swing outward therefrom, the free ends of said supporting members having angularly extending foot portions, a member slidably mounted in said hollow member, a rigid spider carried at the lower end of said slidable member, and a plurality of anti-friction devices carried by said spider, said devices engaging said flanges to cause said supporting members to swing outward or inward when said slidable member is moved in said hollow member, the angularly extending foot portions of said flanges serving as cam surfaces to fully retract and impart initial movement to said supporting members during operation of the device.

6. In a device of the class described, a hollow member, a plurality of supporting members, each being T-shaped in cross-section, pivoted at one end to said hollow member and adapted to swing outward therefrom, the free ends of said supporting members having angularly extending foot portions, a member slidably mounted in said hollow member, a rigid spider carried at the lower end of said slidable member, and a plurality of rollers carried by said spider, said rollers engaging the longitudinal flanges of said supporting members to cause them to swing outward or inward when said slidable member is moved in said hollow member, the angularly extending foot portions of said flanges serving as cam surfaces to fully retract and impart initial movement to said supporting members during operation of the device.

CHARLES A. WRIGHT.